United States Patent [19]
Mahon

[11] 4,178,819
[45] Dec. 18, 1979

[54] VIBRATION DAMPENING DEVICE FOR ROTATING DISK

[76] Inventor: Fred F. Mahon, 23 Willis Ave., Greenville, S.C. 29611

[21] Appl. No.: 932,774

[22] Filed: Aug. 11, 1978

[51] Int. Cl.² .................. B23B 25/00; B23Q 11/00
[52] U.S. Cl. .................................. 82/38 A; 82/2 A; 82/4 A; 89/DIG. 9
[58] Field of Search ............... 82/2 A, 4 A, 38, 38 A, 82/DIG. 9; 408/143

[56] References Cited
U.S. PATENT DOCUMENTS

| | | | |
|---|---|---|---|
| 3,691,878 | 9/1972 | Mitchell | 82/38 R |
| 3,710,661 | 1/1973 | Mitchell | 82/38 A |

*Primary Examiner*—Z. R. Bilinsky
*Attorney, Agent, or Firm*—Bailey, Dority & Flint

[57] ABSTRACT

A device for reducing chattering and vibrations in a rotating disk while opposed surfaces of the disk are being cut with cutting tools on a disk cutting machine. The device includes a pair of laterally spaced elongated rigid arms which have pads carried on the inner ends thereof. A bracket which is attached to the cutting machine has a pair of flanges integral therewith, through which a rod extends pivotally attaching the rigid arms to the bracket. A first resilient member is carried on the rod resiliently biasing the other ends of the arms against the flanges. An adjustable resilient member is carried adjacent the intermediate portion of the arms for forcing the pads carried on the inner end in contact with the surface of the disks.

3 Claims, 2 Drawing Figures

VIBRATION DAMPENING DEVICE FOR ROTATING DISK

BACKGROUND OF THE INVENTION

In refurbishing disks that are used in automobiles and the like as part of a disk braking system, it is often necessary to utilize a cutting tool for preparing the opposed surfaces of the disk so that the faces of the disk are smooth. This is essential to proper operation of disk brakes since in operation friction elements are pressed into the faces of the disks for stoping the vehicle. If the disks have grooves or uneven faces the braking action is interfered with as well as premature wear between the faces and the friction elements occurs.

Heretofore when refurbishing disks, a cutting machine having a rotational spindle is utilized. The disk is mounted on the spindle and cutting tools are brought into contact with the opposed faces of the disk and moved radially therealong for removing the uneven portions of metal provided on the surfaces. However, if chattering or vibrations develop in the rotating disks during the cutting operation, an uneven surface is produced. In order to minimize this problem, a vibration dampener for inhibiting vibrations in the rotating disks have been utilized. One such vibration dampening mechanism is disclosed in the U.S. Pat. No. 3,691,898. In this particular device pressure pads are brought in contact with the surface of the disk while the cutting tools are being used for cutting away the excess metal.

Another vibration dampening device is disclosed in U.S. Pat. No. 3,710,661.

This device discloses mounting pads on a spring that is constructed as a unitary piece of spring metal in the general shape of a figure eight and having aligned inturned ends from which the pads are mounted. One apparent problem with such a device is that there is no means of adjusting the pressure exerted on the face of the disk during the cutting operation. This is important since disks for different size and types of vehicles have different thicknesses and a vibration dampening device set for one particular size disk may not be suitable for larger or smaller size disk.

SUMMARY OF THE INVENTION

The invention relates to a device for reducing chattering and vibrations in a rotating disk while opposed surfaces of the disk are being cut with cutting tools on a disk cutting machine. The device includes a pair of laterally spaced elongated rigid arms which have pads carried on the inner ends thereof. A bracket is provided for mounting the device on the cutting machine adjacent the disk. A pair of spaced inwardly extended flanges are carried on the bracket and a rod member extends between the flanges. The outer ends of the rigid arms have holes provided therein through which the rod member extends pivotally supporting the arms on the bracket. A first resilient member is carried on the rod between the outer ends of the rigid arms resiliently biasing the outer ends of the arms against the flanges. A second resilient biasing means engages the arms intermediate the ends thereof forcing the pads in engagement with the opposed surfaces of the disk minimizing vibrations. The second resilient biasing means can be adjusted for varying the pressure exerted by the pads on the opposed surfaces of the disk.

The second resilient biasing means includes an elongated threaded member that extends through holes provided in the intermediate portions of the arms. A threaded nut is carried on one end of the rod with an enlarged head carried on the other end. A spring is carried between the head and the outer surface of one arm and between the threaded nut and the other outer surface of the other arm. By tightening or loosening the nut, the pressure exerted by the springs on the outer surfaces of the arms can be varied so as to vary the pressure between the pads carried on the inner ends of the arm and the disks being cut.

Accordingly, it is an object of the present invention to provide a vibration dampening device which is readily suitable for use on disk cutting machines for minimizing vibrations in disks of different sizes.

Still an another important object of the present invention is to provide a simple and reliable vibration dampening device for disk cutting machines which can be readily adjusted for different size disks.

These and other objects and adjantages of the invention will become apparent upon reference of the following specifications, attendant claims, and drawing.

DESCRIPTION OF THE PREFERRED EMBODIMENT

Figure 1:
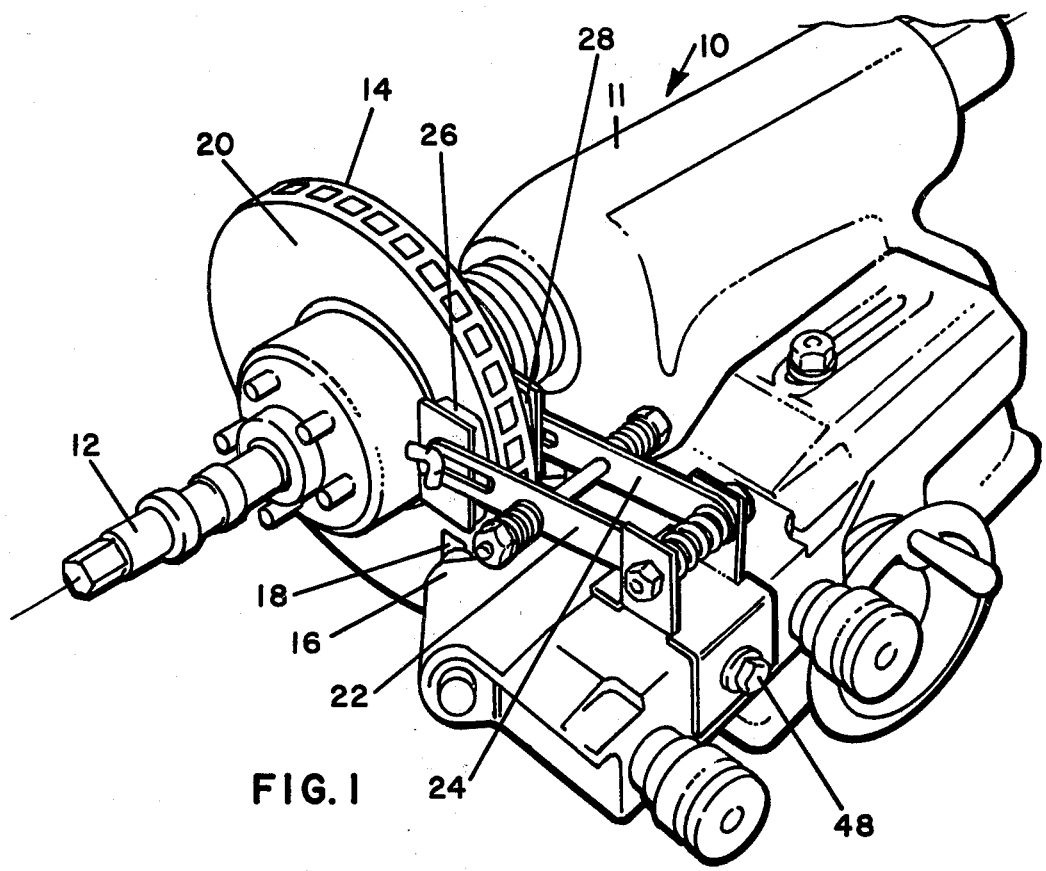
FIG. 1 is perspective view illustrating a conventional disk cutting machine equipted with a vibration dampening device constructed in accordance with the present invention.

In FIG. 1 there is illustrated a conventional lathe generally designated by the reference character 10 which has a main housing 11 with a rotating arbor 12 extending out the end thereof. A disk 14 is mounted on the arbor in a conventional manner for rotating therewith. A pair of tool holders 16 are mounted on opposed sides of the disk (only one being illustrated) for supporting two bits 18 which are used for cutting the faces 20 of the disk 14 as the disk is rotated on the lathe. The tool holders are mounted on a conventional cross-feed assembly so that they can be moved radially during the cutting operation of the faces of the disks. Such a cutting tool is a conventional device and one such device is disclosed in more detail in U.S. Pat. No. 3,710,661.

One problem with preparing the faces of the disks on a lathe such as illustrated is that often times chattering or vibrations will develop in the disks, preventing the cutting of smooth surfaces on the faces of the disks.

In order to reduce the vibrations that develop in the device during the cutting operation, a dampening device constructed in the accordance with the present invention is mounted on the cutting machine.

The dampening device includes a pair of laterally spaced rigid arms 22 and 24 that are constructed of any suitable material such as steel. Dampening pads 26 and 28 are carried on the inner ends of the arms 22 and 24 for engaging the opposed faces of the rotating disk 14. These dampening pads may be constructed of any suitable conventional material such as commonly used for disk brake pads and are normally provided with surfaces 30 and 32 made from a low-friction material. Other suitable low-friction materials can be utilized for the surfaces of the pads.

Figure 2:
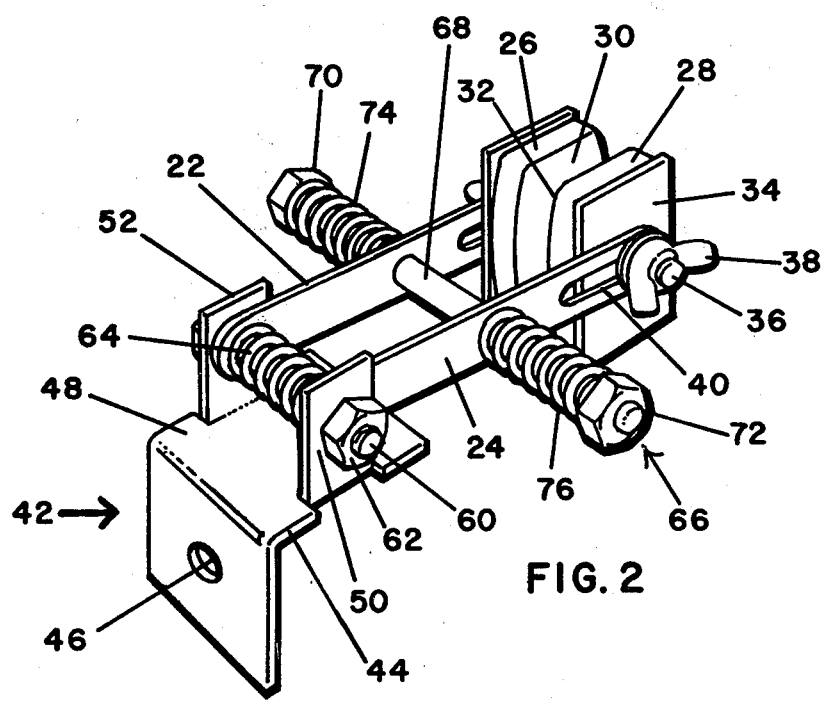
FIG. 2 is a perspective view illustrating the vibration dampening device removed from the disk cutting machine such as illustrated in FIG. 1.

The pads include a rigid backing member 34 which has projecting outwardly therefrom a threaded bolt 36. A wing nut 38 is provided on the bolt 36 for securing the pad to the inner end of the arms 22 and 24. As is illustrated in FIG. 2 the inner ends of the arms 22 and 24 have elongated slots 40 provided therein through which the bolt 36 extends. As a result the position of the pads can be adjusted relative to the end of the arms 22 and 24. The wing nut 38 permits readily changing of the pads when such become worn.

The bracket 42 is provided for securing the dampening device to the side of the lathe. This bracket includes a right angle shaped member 44 which has a hole 46 extending through a vertical flange portion thereof through which a bolt 48 extends for securing the bracket to the side of the lathe. Projecting upwardly from a horizontal flange portion 48 are a pair of flanges 50 and 52. A bolt 60 extends through holes provided in the flanges 50 and 52 and is secured thereto by means of a nut 62.

The outer ends of the arms 22 and 24 have holes provided therein through which the bolt 60 passes for pivotally securing the arms 22 and 24 to the bracket 42. A first resilient member in the form of a coil spring 64 is carried on the bolt 60 and presses against the inner surfaces of the arms forcing the outer ends of the arm against the flanges 50 and 52.

A second resilient biasing means generally designated by the reference character 66 is provided for producing a biasing force on the inner ends of the arms and as a result pressing the pads 26 and 28 in contact with the faces of the rotating disk 14.

The second resilient biasing means includes a large bolt 68 which extends through holes provided in an intermediate portion of the arms 22 and 24. On one end of the bolt 68 is an enlarged head 70 and threaded on the other end of the bolt 68 is a nut 72.

Positioned between the head 70 and the outer surface of the arm 22 is a spring 74. Another spring 76 is positioned on the rod-like member 68 between the adjustable nut 72 and the outer surface of the arm 24.

When the dampening device is not in use it can be pivoted to an upright position on the bolt 60 so as to permit the disk to be inserted on or removed from the arbor 12 of the lathe. After the disk has been positioned on the lathe the arms are pivoted downwardly to the position shown in FIG. 1 with the pads 26 and 28 engaging the faces thereof. Depending on the thickness of the disk 14, the nut 72 can be rotated for varying the pressure between the pads and the surfaces of the disk. It is noted that the first spring member 64 and the second springs 74 and 76 cooperate to apply pressure on the face of the disk through the pads 26 and 28. However, even though all of the springs 64, 74 and 76 cooperately apply pressure on the pads, it is only necessary to adjust the nut 72 for varying the pressure exerted.

While a preferred embodiment of the invention has been described using specific terms, such description is for illustrative purposes only, and it is to be understood that changes and variations may be made without departing from the spirit or scope of the following claims.

What is claimed is:

1. A device for reducing chattering in a rotating disk while opposed surfaces of said disk are being cut with cutting tools on a disk cutting machine, said device comprising:
    a pair of laterally spaced elongated rigid arms,
    pads carried on inner ends of said arms,
    a bracket for mounting said device on said cutting machine adjacent said disk,
    a pair of spaced flanges carried on said bracket,
    a rod member extending between said flanges,
    said outer ends of said rigid arms having holes provided therein through which said rod member extends pivotally supporting said arms on said bracket,
    a first resilient member carried on said rod between said outer ends of said rigid arms resiliently biasing said outer ends of said arms against said flanges,
    second resilient biasing means engaging said arms forcing said pads in engagement with said opposed surfaces of said disk minimizing vibrations, and
    means for adjusting said second resilient biasing means for varying the pressure exerted by said pads on said opposed surfaces of said disk.

2. The device as set forth in claim 1 wherein said second resilient biasing means comprises:
    a bolt extending through intermediate portions of said arms having an enlarged head on one end,
    a nut threaded on the other end of said bolt,
    a first spring carried on said bolt between said enlarged head and one of said arms,
    a second spring carried on said bolt between said nut and said other arm.

3. The device as set forth in claim 1 further comprising:
    elongated slots provided adjacent said inner ends of said arm, and
    bolts carried by said pads and extending through a respective slot in said arms for adjustable securing said pads adjacent the inner ends of said arm.

* * * * *